(12) United States Patent
Faruque et al.

(10) Patent No.: US 11,975,670 B1
(45) Date of Patent: *May 7, 2024

(54) VEHICLE SEAT ARMREST WITH TRANSLATABLE AND PIVOTABLE BAR AND AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,951

(22) Filed: Mar. 30, 2023

(51) Int. Cl.
*B60R 21/207* (2006.01)
*B60N 2/75* (2018.01)
*B60R 21/233* (2006.01)

(52) U.S. Cl.
CPC .............. *B60R 21/207* (2013.01); *B60N 2/79* (2018.02); *B60R 21/233* (2013.01)

(58) Field of Classification Search
CPC ............ B60R 21/207; B60R 21/23138; B60R 21/2334; B60N 2/68; B60N 2002/022; B60N 2/75; B60N 2/79
See application file for complete search history.

(56) References Cited

U.S. PATENT DOCUMENTS

| | | | |
|---|---|---|---|
| 5,492,361 A | 2/1996 | Kim | |
| 5,730,458 A | 3/1998 | Byon | |
| 9,238,425 B2 * | 1/2016 | Fukawatase | B60R 21/013 |
| 10,343,644 B2 | 7/2019 | Dry et al. | |
| 10,569,732 B2 | 2/2020 | Nagasawa | |
| 10,632,952 B2 * | 4/2020 | Markusic | B60R 21/231 |
| 10,926,733 B2 * | 2/2021 | Dry | B60R 21/23138 |
| 11,541,840 B2 | 1/2023 | Jaradi et al. | |
| 11,702,025 B1 * | 7/2023 | Jaradi | B60N 2/4214 280/730.1 |
| 2019/0118754 A1 * | 4/2019 | Dry | B60R 21/207 |

FOREIGN PATENT DOCUMENTS

| | | | | |
|---|---|---|---|---|
| DE | 102018124649 A1 * | 4/2019 | | B60N 2/753 |
| DE | 102018126409 A1 * | 4/2019 | | B60N 2/14 |
| JP | 2018172002 A | 11/2018 | | |
| KR | 101356198 B1 | 1/2014 | | |

* cited by examiner

*Primary Examiner* — Faye M Fleming
(74) *Attorney, Agent, or Firm* — Frank A. MacKenzie; Bejin Bieneman PLC

(57) ABSTRACT

An assembly includes a seat, an armrest supported by the seat, and a bar supported by the armrest. The armrest is elongated along an axis. The bar is translatable along the axis from a stowed position overlapping the armrest to a deployed position extending from the armrest. The bar is pivotable relative to the armrest in a seat-inboard direction from a non-pivoted position to a pivoted position. An airbag is supported by the bar. The airbag is inflatable from the bar to an inflated position when the bar is in the deployed position and the pivoted position. The airbag includes a first inflatable portion inflatable along the bar and a second inflatable portion supported by the first inflatable portion in the inflated position. The first inflatable portion surrounds the bar in the inflated position. The second inflatable portion is inflatable upwardly from the first inflatable portion.

20 Claims, 14 Drawing Sheets

VEHICLE SEAT ARMREST WITH TRANSLATABLE AND PIVOTABLE BAR AND AIRBAG

BACKGROUND

Vehicles are equipped with airbags. In the event of certain impacts, an inflator activates and provides inflation medium to the airbags, and the airbags pressurize and act as supplemental restraints for occupants during certain impacts. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
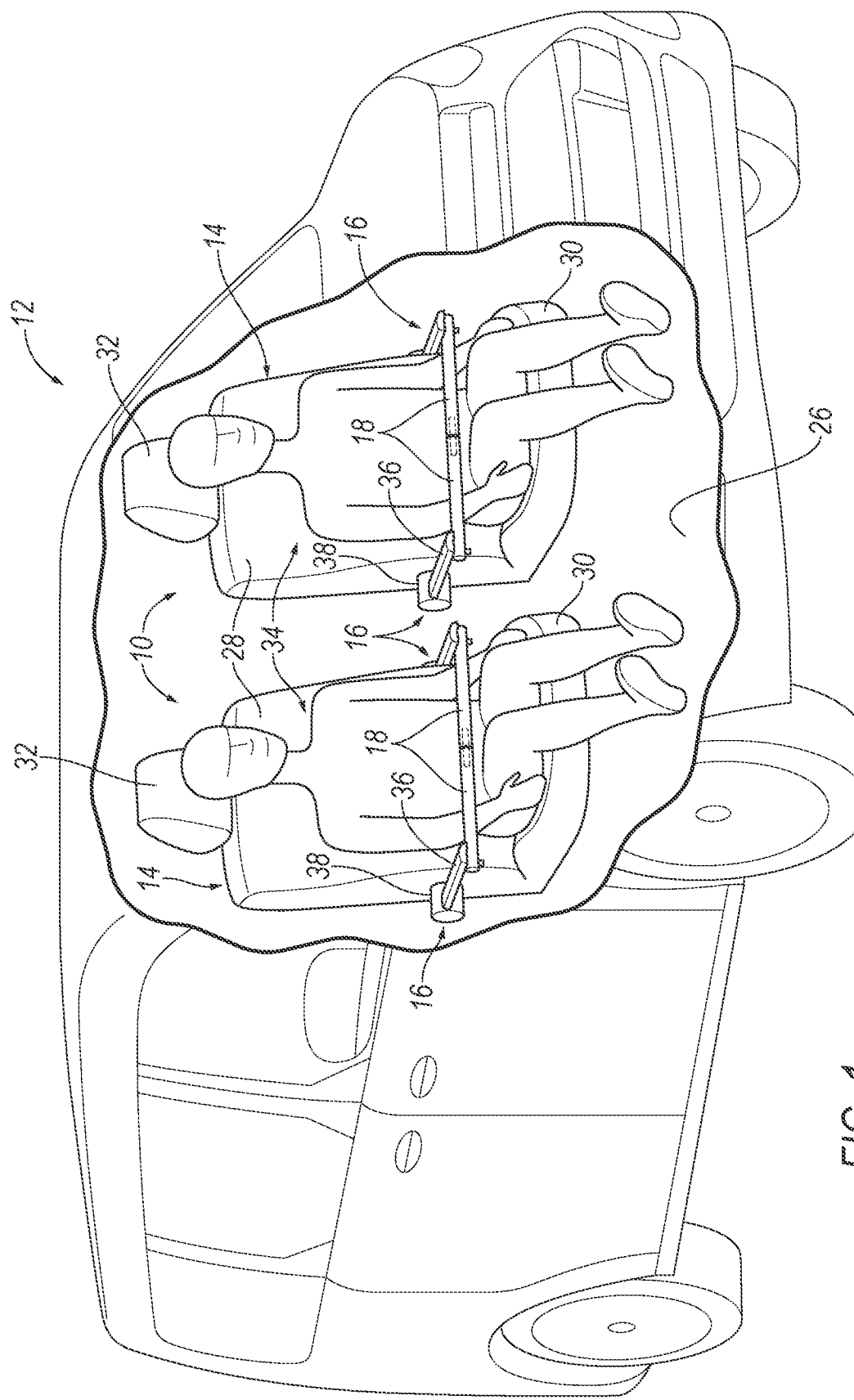
FIG. 1 is a perspective view of a vehicle having a pair of vehicle seats.

An assembly for a vehicle includes a seat and an armrest supported by the seat. The armrest is elongated along a first axis. The assembly includes a bar supported by the armrest. The bar is translatable along the first axis from a stowed position overlapping the armrest to a deployed position extending from the armrest. The bar is pivotable relative to the armrest in a seat-inboard direction from a non-pivoted position to a pivoted position. An airbag is supported by the bar. The airbag is inflatable from the bar to an inflated position when the bar is in the deployed position and the pivoted position. The airbag includes a first inflatable portion inflatable along the bar. The first inflatable portion surrounds the bar in the inflated position. The airbag includes a second inflatable portion supported by the first inflatable portion in the inflated position. The second inflatable portion is inflatable upwardly from the first inflatable portion.

The assembly may include a second armrest supported by the seat, the second armrest spaced in a cross-seat direction from the armrest and the second armrest being elongated along a second axis spaced from the axis and a second bar supported by the second armrest. The second bar may be translatable along the second axis from a stowed position overlapping the second armrest to a deployed position extending from the armrest. The second bar may be pivotable relative to the second armrest in a seat-inboard direction from a non-pivoted position to a pivoted position.

The first inflatable portion may be inflatable along the bar and the second bar when the bar and the second bar are in the deployed positions and the pivoted positions. The first inflatable portion may surround the bar and the second bar in the inflated position.

The first inflatable portion may extend from the armrest to the second armrest in the inflated position.

The bar may be lockable to the second bar in the pivoted positions and the deployed positions.

The seat may define an occupant seating area between the seat and the bar when the bar is in the pivoted position and the deployed position.

The occupant seating area may be between the seat and the second inflatable portion.

The first inflatable portion may inflate away from the armrest to a distal end spaced along the bar from the armrest. The distal end may be movable along the bar as the airbag inflates to the inflated position.

The assembly may include a tether elongated from the seat to the airbag.

The tether may be elongated from the seat to the first inflatable portion of the airbag.

The seat may include a seatback elongated along a second axis and the airbag is inflatable from an uninflated position to the inflated position, the tether being elongated along the second axis of the seatback to the airbag when the airbag is in the uninflated position and when the bar is in the stowed position and non-pivoted position.

The seat may include a seatback elongated along a second axis and the airbag is inflatable from an uninflated position to the inflated position. The tether may be elongated along the second axis of the seatback and the axis of the armrest when the airbag is in the uninflated position and the bar is in the deployed position and the pivoted position.

The tether may be elongated from the seatback to the first inflatable portion of the airbag when the airbag is in the inflated position.

The first inflatable portion may inflate away from the armrest to a distal end spaced from the armrest. The tether may be elongated from the seat to the distal end of the first inflatable portion.

The seat may define an occupant seating area between the seat and the second inflatable portion. The tether may extend across the occupant seating area when the airbag is in the inflated position.

The second inflatable portion may include a seat-inboard panel facing toward the seat and a seat-outboard panel facing away from the seat. The tether may be elongated along the seat-outboard panel when the airbag is in the inflated position.

The tether may abut the seat-outboard panel when the airbag is in the inflated position.

The tether may abut the second inflatable portion when the airbag is in the inflated position.

The first inflatable portion may be of an inflatable polymeric material.

The first inflatable portion may be in fluid communication with the second inflatable portion.

With reference to the Figures, wherein like numerals indicate like parts throughout the several views, an assembly 10 for a vehicle 12 includes a seat 14 and an armrest 16 supported by the seat 14. The armrest 16 is elongated along a first axis A. The assembly 10 includes a bar 18 supported by the armrest 16. The bar 18 is translatable along the first axis A from a stowed position overlapping the armrest 16 to a deployed position extending from the armrest 16. The bar 18 is pivotable relative to the armrest 16 in a seat-inboard direction D from a non-pivoted position to a pivoted position. An airbag 20 is supported by the bar 18. The airbag 20 is inflatable from the bar 18 to an inflated position when the bar 18 is in the deployed position and the pivoted position. The airbag 20 includes a first inflatable portion 22 inflatable along the bar 18. The first inflatable portion 22 surrounds the bar 18 in the inflated position. The airbag 20 includes a second inflatable portion 24 supported by the first inflatable portion 22 in the inflated position. The second inflatable portion 24 is inflatable upwardly from the first inflatable portion 22.

The bar 18 may move to the pivoted position and the deployed position when an occupant is seated in the vehicle 12. The bar 18 may extend seat-forward of the occupant when the occupant is seated in the seat 14. When the occupant plans to exit the seat 14, the bar 18 may move to the stowed position and the non-pivoted position. In the event of certain vehicle impacts, the airbag 20 may inflate to the inflated position when the bar 18 is in the pivoted position and the deployed position. The first inflatable portion 22 surrounds the bar 18 in the inflated position and the second inflatable portion 24 is inflatable upwardly from the first inflatable portion 22 to control the kinematics of the occupant in the seat 14. The airbag 20 remains in an uninflated position when no vehicle impact occurs.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc.

The vehicle 12, specifically a body (not numbered) of the vehicle 12, includes a vehicle floor 26 and a vehicle roof (not numbered) spaced from the vehicle floor 26. The vehicle floor 26 may include upholstery, for example, carpet, and may have a class-A surface facing the passenger compartment, i.e., a surface specifically manufactured to have a high quality, finished, aesthetic appearance free of blemishes.

The vehicle 12 defines a passenger compartment (not numbered) to house occupants, if any, of the vehicle 12. The passenger compartment may extend across the vehicle 12, i.e., from one side to the other side of the vehicle 12. The passenger compartment includes a front end (not numbered) and a rear end (not numbered) with the front end being in front of the rear end during forward movement of the vehicle 12.

With continued reference to FIG. 1, the vehicle 12 may include one or more seats 14. Specifically, the vehicle 12 may include any suitable number of seats 14. The seats 14 are supported by the vehicle floor 26. The seats 14 may be arranged in any suitable arrangement in the passenger compartment. As in the example shown in the Figures, one or more of the seats 14 may be at the front end of the passenger compartment, e.g., a driver seat and/or a passenger seat. In other examples, one or more of the seats 14 may be behind the front end of the passenger compartment, e.g., at the rear end of the passenger compartment. The seats 14 may be movable relative to the vehicle floor 26 to various positions, e.g., movable fore-and-aft and/or cross-vehicle. The seat 14 may be of any suitable type, e.g., a bucket seat.

The seat 14 includes a seatback 28, a seat bottom 30, and a head restraint 32. The head restraint 32 may be supported by and extending upwardly from the seatback 28. The head restraint 32 may be stationary or movable relative to the seatback 28. The seatback 28 may be supported by the seat bottom 30 and may be stationary or movable relative to the seat bottom 30. The seatback 28 may be elongated upwardly from the seat bottom 30 along a second axis B. The seatback 28, the seat bottom 30, and the head restraint 32 may be adjustable in multiple degrees of freedom. Specifically, the seatback 28, the seat bottom 30, and the head restraint 32 may themselves be adjustable. In other words, adjustable components within the seatback 28, the seat bottom 30, and the head restraint 32 may be adjustable relative to each other.

The seatback 28 includes the seat frame (not shown) and a covering (not numbered) supported on the seat frame. The seat frame may include tubes, beams, etc. Specifically, the seat frame includes a pair of upright frame members (not shown). The upright frame members are elongated, and specifically, are elongated in a generally upright direction when the seatback 28 is in a generally upright position. The upright frame members are spaced from each other and the seat frame includes one or move cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

As an example, the seat frame may include a seatback frame (not shown) and a seat bottom frame (not shown). Specifically, the seatback 28 may include the seatback frame and the seat bottom 30 may include the seat bottom frame. The seat frame, e.g., the seat bottom frame and the seatback frame, may include tubes, beams, etc. The seat frame may be of any suitable plastic material, e.g., carbon fiber reinforced plastic (CFRP), glass fiber-reinforced semi-finished thermoplastic composite (organosheet), etc. The seat frame may be metal. As another example, some or all components of the seatback frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seat 14 defines an occupant seating area 34. The occupant seating area 34 is the area occupied by an occupant when properly seated on the seat bottom 30 and the seatback 28. The occupant seating area 34 is in a seat-forward direction of the seatback 28 and above the seat bottom 30. In the example shown in the Figures, the occupant seating area 34 faces the front end of the passenger compartment when the seat 14 is in the forward-facing position and the occupant seating area 34 faces the rear end of the passenger compartment when the seat 14 is in the rearward-facing position.

With reference to FIGS. 1-5B, the assembly 10 includes the armrest 16 supported by the seat 14. Specifically, in the example shown in the Figures, the assembly 10 includes a pair of armrests 16 spaced in a cross-seat direction C from each other. The seatback 28 and the seat bottom 30 may be between the armrests 16. In such an example, the armrests 16 are supported by the seatback 28 of the seat 14. Specifically, the armrests 16 may be supported by the seat frame of the seat 14. The armrests 16 may be supported by the seatback frame. In other examples, the armrests 16 may be supported by the seat bottom 30 of the seat 14. Specifically, the armrests 16 may be supported by the seat bottom frame. The weight an occupant places on the either of the armrests 16 when seated in the seat 14 is supported by the seat frame.

As shown in the Figures, the armrests 16 may be supported on each side of the seatback 28. Specifically, the occupant seating area 34 of the seat 14 is between the armrests 16. When an occupant is properly seated in the seat 14, the occupant has an armrest 16 to their right and an armrest 16 to their left.

The armrests 16 include an arm support portion 36 and a structural portion 38. The arm support portion 36 of the armrests 16 is supported on the seatback 28 by the structural portion 38. Specifically, the arm support portion 36 may be mounted to the structural portion 38, e.g., by fasteners, welding, etc. The arm support portion 36 is designed to support an arm of an occupant that may be seated in the seat 14. The structural portion 38 is connected to the seatback 28. Specifically, the structural portion 38 may be supported by the seat frame. The structural portion 38 may be supported by the seat frame in any suitable way at any suitable location. The structural portion 38 may be mounted to the seat frame, e.g., by fasteners, welding, etc. In some examples, such as shown in the Figures, the structural portion 38 may be supported by the seat bottom frame. In other examples, the structural portion 38 may be supported by the seatback frame.

The armrests 16 are each elongated along the first axis A. Specifically, the arm support portion 36 of each of the armrests 16 is elongated along the first axes A. Each of the first axes A may be elongated in a generally seat-fore-and-aft direction, i.e., along a seat-longitudinal direction S. Specifically, the first axes A may be elongated in the seat-longitudinal direction S and may deviate from the seat-longitudinal direction S at a suitable angle to support an arm of an occupant. The first axes A of the armrests 16 may be spaced from each other in the cross-seat direction C. The arm support portion 36 may be covered, e.g., with an upholstery, padding, etc.

The arm support portions 36 are elongated along the first axes A from a first end 40 to a second end 42. The first ends 40 may be at the structural portions 38 of the armrests 16. The second ends 42 are spaced from the first ends 40 and the structural portions 38 along the first axes A. In other words, the second ends 42 are spaced along the first axes A in the seat-longitudinal direction S from the structural portions 38.

With continued reference to FIGS. 1-5B, the assembly 10 includes a pair of bars 18 supported by the armrests 16. Specifically, the assembly 10 includes two bars 18 with each bar 18 being supported by each armrest 16, respectively. The bars 18 may each include a pin 44 and a carrier 46 engageable with the armrest 16. Specifically, each pin 44 and carrier 46 are engageable with each armrest 16. The bars 18 each extend from the pin 44 to a bar distal end 48 spaced from the pin. The armrests 16 may define a slot 50 elongated along the first axes A on a bottom side 52 of the arm support portions 36, i.e., on a bottom side 52 of the armrests 16. In other words, the bars 18 may be supported on a side of the arm support portion 36 opposite where an occupant may put their arm during use of the armrest 16. The pins and the carriers 46 may be engageable with the slots 50 of the armrests 16.

The bars 18 are movable relative to the armrest 16 when an occupant is seated in the seat 14. Specifically, the bars 18 are translatable relative to the armrest 16 and the bars 18 are pivotable relative to the armrest 16. In other words, the bars 18 translate long the first axes A of the armrests 16 and pivot about the pins. In some examples, the bars 18 may translate and pivot relative to the armrests 16 simultaneously. In other words, as the bars 18 are translating, the bars 18 may begin to pivot relative to the armrests 16. In other examples, the bars 18 may first translate and later pivot relative to the armrests 16.

As discussed above, the bars 18 are translatable along the first axes A. Specifically, the bars 18 are translatable in the seat-longitudinal direction S from the stowed position to the deployed position. The bars 18 are translatable in the seat-longitudinal direction S. In other words, the bars 18 may move linearly along the armrest 16, e.g., along the slot 50, to the deployed position. Specifically, the pin 44 and carrier 46 of the bars 18 translate along the slot 50 of the armrest 16 from the first ends 40 of the arm support portions 36 toward the second ends 42 of the arm support portions 36 to the deployed position. The pin 44 and the carrier 46 move away from the first end 40 of the arm support portion 36 toward the second end 42 of the arm support portion 36 as the bar 18 moves toward the deployed position.

Figure 2A:
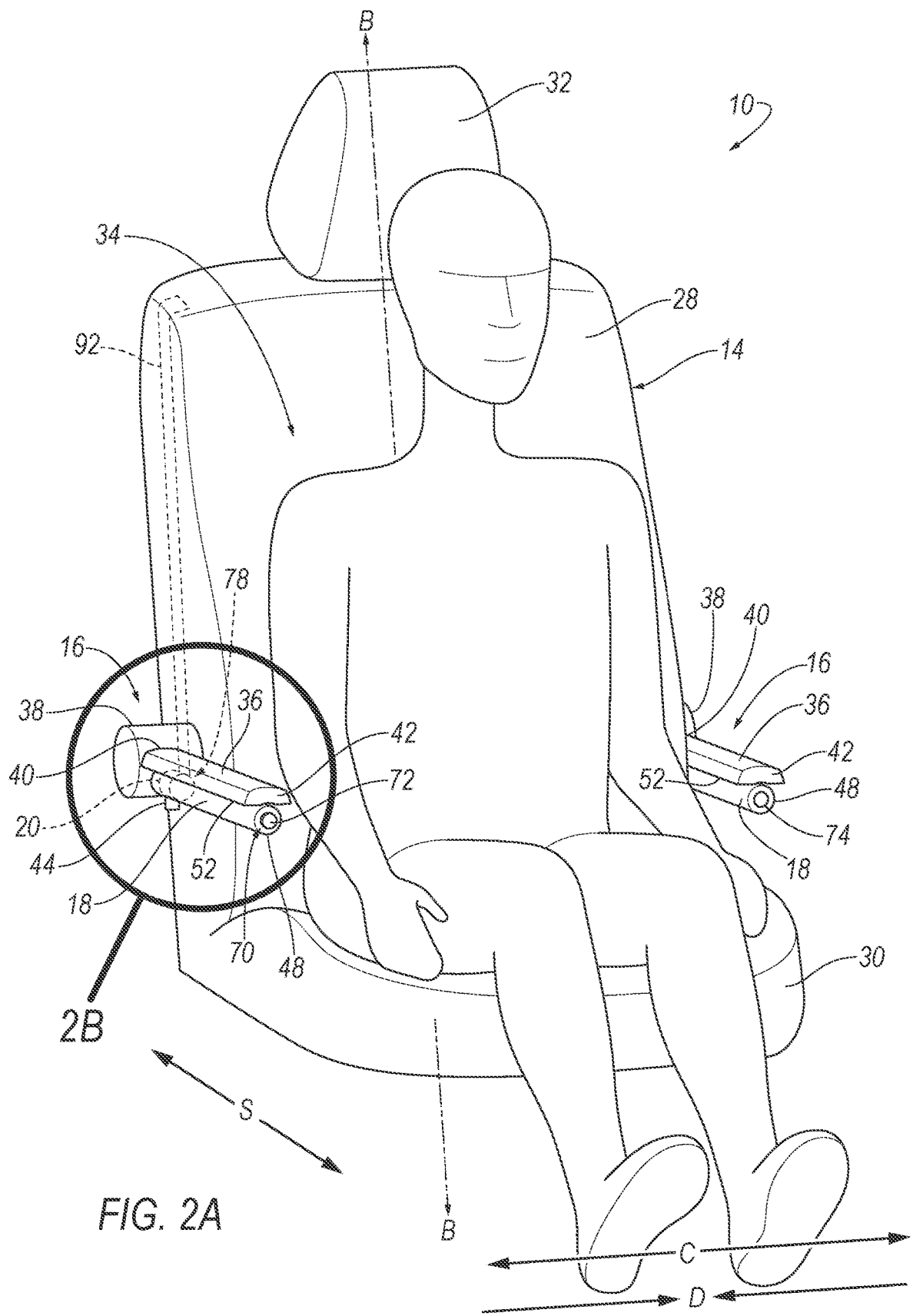
FIG. 2A is a perspective view of a vehicle seat having an armrest.
Figure 2B:
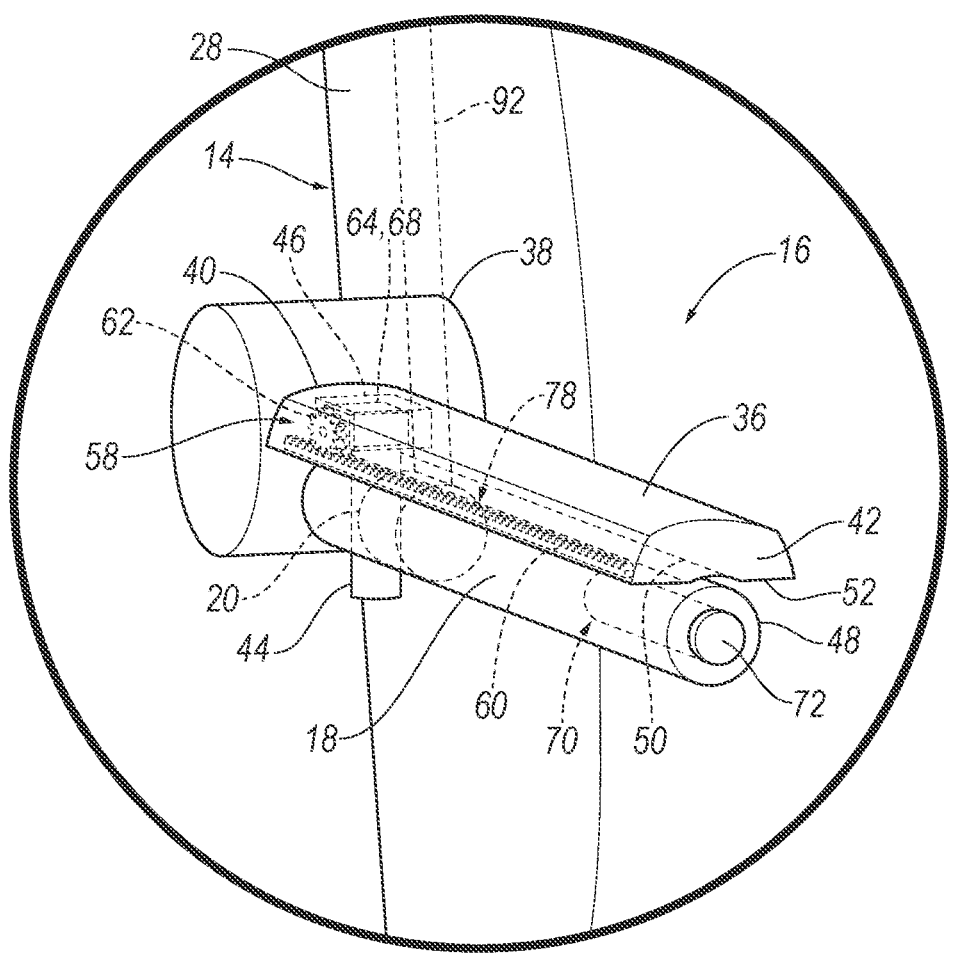
FIG. 2B is a perspective view of the armrest and a bar supported by the armrest in a stowed position and a non-pivoted position.

In the stowed position, the bars 18 supported by each of the armrests 16 are overlapping the armrest 16. Specifically, the bars 18 may each at least partially overlap the armrest 16 in the stowed position. In other words, in some examples the bars 18 may completely overlap the armrest 16 and in other examples the bars 18 may partially overlap the armrest 16. In the example shown in the Figures, specifically as shown in FIGS. 2A and 2B, in examples where the bars 18 completely overlap the armrest 16 in the stowed position, the bars 18 are not visible from a top view of the armrest 16. In other examples, for example where the bars 18 only partially overlap the armrest 16 in the stowed position, the bar 18 may be visible from a top view of the armrests 16. In the stowed position, the bars 18 may be elongated along the first axes A and the bars 18 may be elongated along the arm support portion 36 of the armrest 16. Specifically, the bars 18 may be generally parallel to the arm support portion 36 in the stowed position. The bar distal end 48 of the bar 18 may be adjacent and aligned with the second end 42 of the arm support portion 36 in the stowed position and the pin 44 may be adjacent the first end 40 of the arm support portion 36 in the stowed position. As shown in the Figures, the bars 18 may be below the arm support portion 36 with both the bars 18 and the arm support portion 36 being elongated along the first axis A and parallel to each other.

In the deployed position, the bars 18 extend from the armrest 16. In other words, the bars 18 begin to move past the second end 42 of the arm support portion 36 of the armrest 16 to extend from the armrest 16. The pins may be at a translational distance T from the stowed position, i.e., from the first end 40 of the arm support portion 36. The translational distance T may be a distance corresponding to a size of an occupant properly seated in the seat 14. In other words, the translational distance T from the stowed position to the deployed position is based on the size of the occupant properly seated in the seat 14. As the pins move to the translational distance T from the stowed position, the bar distal ends 48 of the bars 18 extends past the second ends 42 of the arm support portions 36 to be spaced from the arm support portions 36. As discussed further below, as the bars 18 move to the deployed position and the pivoted position, the bar distal ends 48 may be spaced from the second end 42 of the arm support portion 36 along the seat-longitudinal direction S prior to reaching the pivoted position and along the cross-seat direction C after reaching the pivoted position.

The size of the occupant may be determined by size sensors 54, e.g., an occupant classification sensor, in the vehicle 12. The size of the occupant may be determined based on weight data or other data collected by the size sensors 54.

The translational distance T may be shorter when the occupant is a smaller occupant and may be a greater distance when the occupant is a larger occupant. In other words, the bar 18 is spaced from the seatback 28 in the deployed position. The occupant seating area 34 is between the seatback 28 and the bars 18 when the bars 18 are in the deployed position. The bars 18 are seat-forward of the occupant when the bars 18 are in the deployed position.

With reference to FIGS. 3A-4D, as discussed above, the bars 18 are pivotable relative to the armrest 16. The bars 18 may be pivoted from the non-pivoted position to the pivoted position relative to the armrest 16. Specifically, the bars 18 are pivotable about the pins as the bars 18 move toward the pivoted position. In some examples, such as shown in the Figures, the bars 18 may begin moving from the non-pivoted position toward the pivoted position during the translational movement of the bar 18 along the armrest 16. In other words, the bars 18 both translate to the deployed position and pivot toward the pivoted position simultaneously. In other examples, the bars 18 may remain in the non-pivoted position until the bars 18 reach the deployed position. In such examples, the bars 18 move to the pivoted position after the bars 18 reach the deployed position.

In the non-pivoted position, the bars 18 are elongated along the armrests 16, i.e., generally parallel with the armrest 16. In other words, in the non-pivoted position, the bars 18 remain elongated along the first axis A. The bars 18 remain elongated along the first axis A until the bars 18 begin to pivot toward the pivoted position. As the bars 18 move toward the pivoted position, the bars 18 pivot in the cross-seat direction C. Specifically, the bars 18 pivot in the seat-inboard direction D from the non-pivoted position toward the pivoted position. In other words, the bars 18 pivot toward a center of seat 14 until the bars 18 reach the pivoted position. Because the bars 18 are both moving toward the center of the seat 14, one of the bars 18 pivots in a clockwise direction and the other of the bars 18 pivots in a counterclockwise direction. For example, the bar 18 supported by the right armrest 16 relative to an occupant seated in the seat 14 pivots in a counterclockwise direction and the bar 18 supported by the left armrest 16 relative to the occupant seated in the seat 14 pivots in a clockwise direction.

In the pivoted position, the bars 18 extend across a lap of an occupant of the seat 14 from one side of the seat 14 to the other side of the seat 14. Specifically, the occupant seating area 34 is between the seatback 28 and the bars 18 when the bars 18 are in the pivoted position. As stated above, the occupant seating area 34 is between the seatback 28 and the bar 18 when the bar 18 is in the deployed position. In other words, the bars 18, in the deployed and the pivoted position, are spaced from the seatback 28 and the occupant seating area 34 is between the bars 18 and the seatback 28. The bars 18 are seat-forward of the occupant when the bars 18 are in the deployed position and the pivoted position.

In the pivoted position, the bar distal ends 48 of the bars 18 are adjacent each other in the cross-seat direction C. The bar distal ends 48 of the bars 18 meet at a joint 56 between the bars 18. In other words, as the bars 18 move toward the pivoted position, the bars 18 converge toward each other at the joint 56. The joint 56 is spaced seat-forward from the seatback 28. Specifically, the occupant seating area 34 is between the joint 56 and the seatback 28. The joint 56 is seat-forward of the occupant seated in the seat 14. The joint 56 may be aligned with the center of the seat 14.

The bars 18 may move to the deployed position and the pivoted position based on an identification of an occupant being seated in the seat 14. For example, the vehicle 12 may include size sensors 54, e.g., a weight sensor, cameras, etc., that identify when an occupant is seated in the seat 14 of the vehicle 12. In the event an occupant is identified in the seat 14, the bars 18 may move to the deployed position and the pivoted position.

Figure 3A:
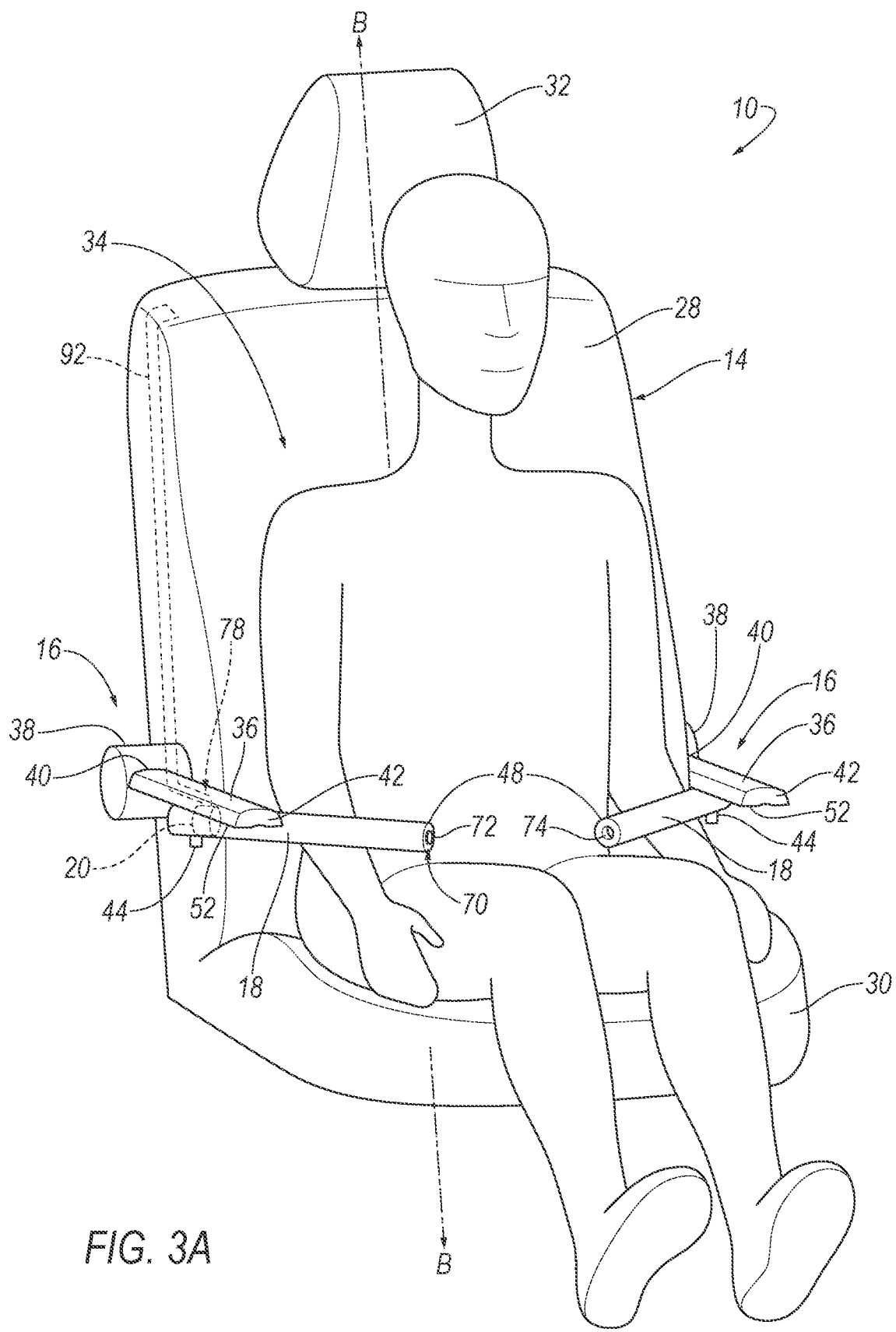
FIG. 3A is a perspective view of the vehicle seat with the bar moving toward a deployed position and a pivoted position.
Figure 3B:
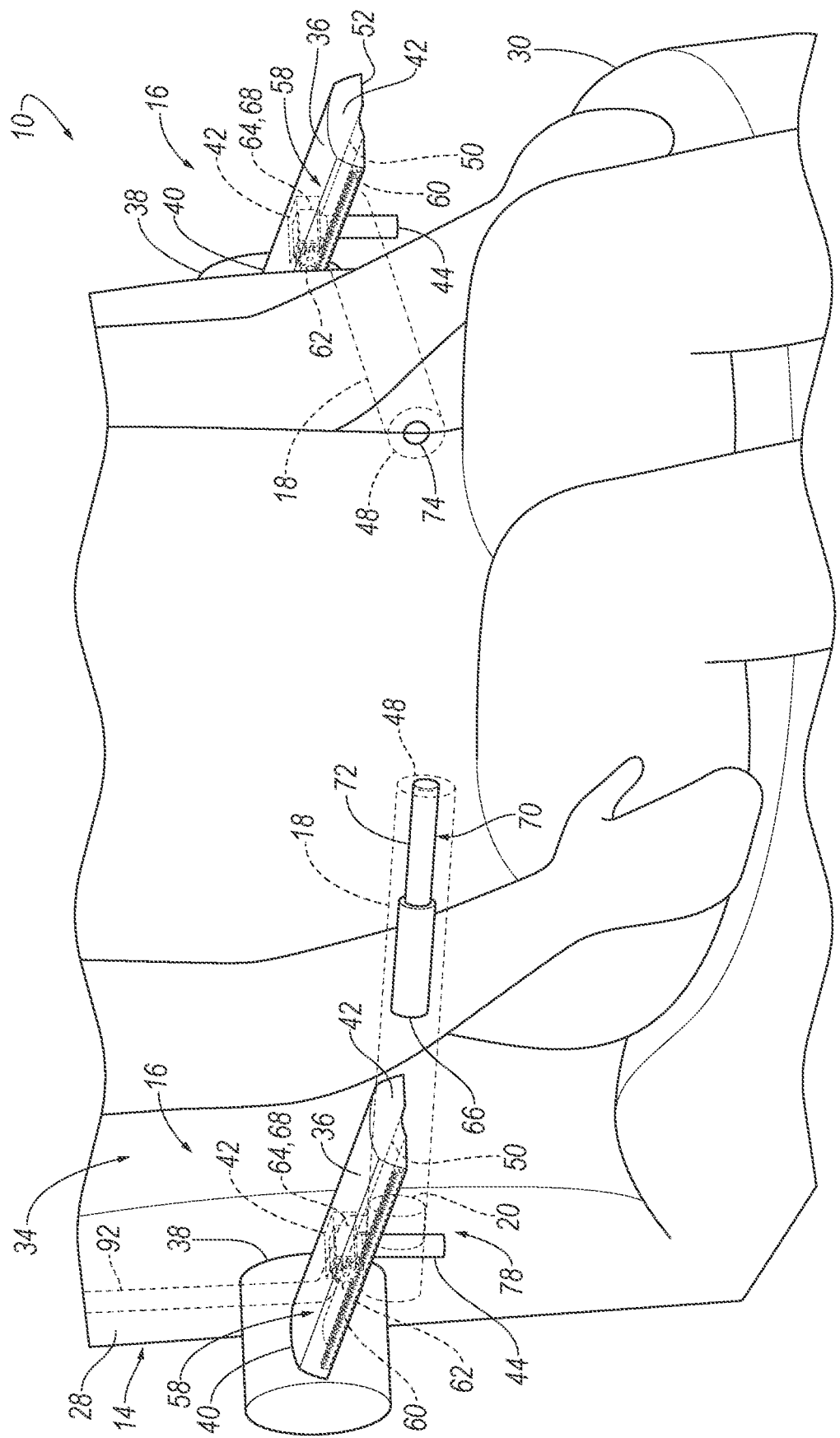
FIG. 3B is a perspective view of the view shown in FIG. 3A of the bars moving toward the deployed position and the pivoted position with the bars having a lock.
Figure 3C:
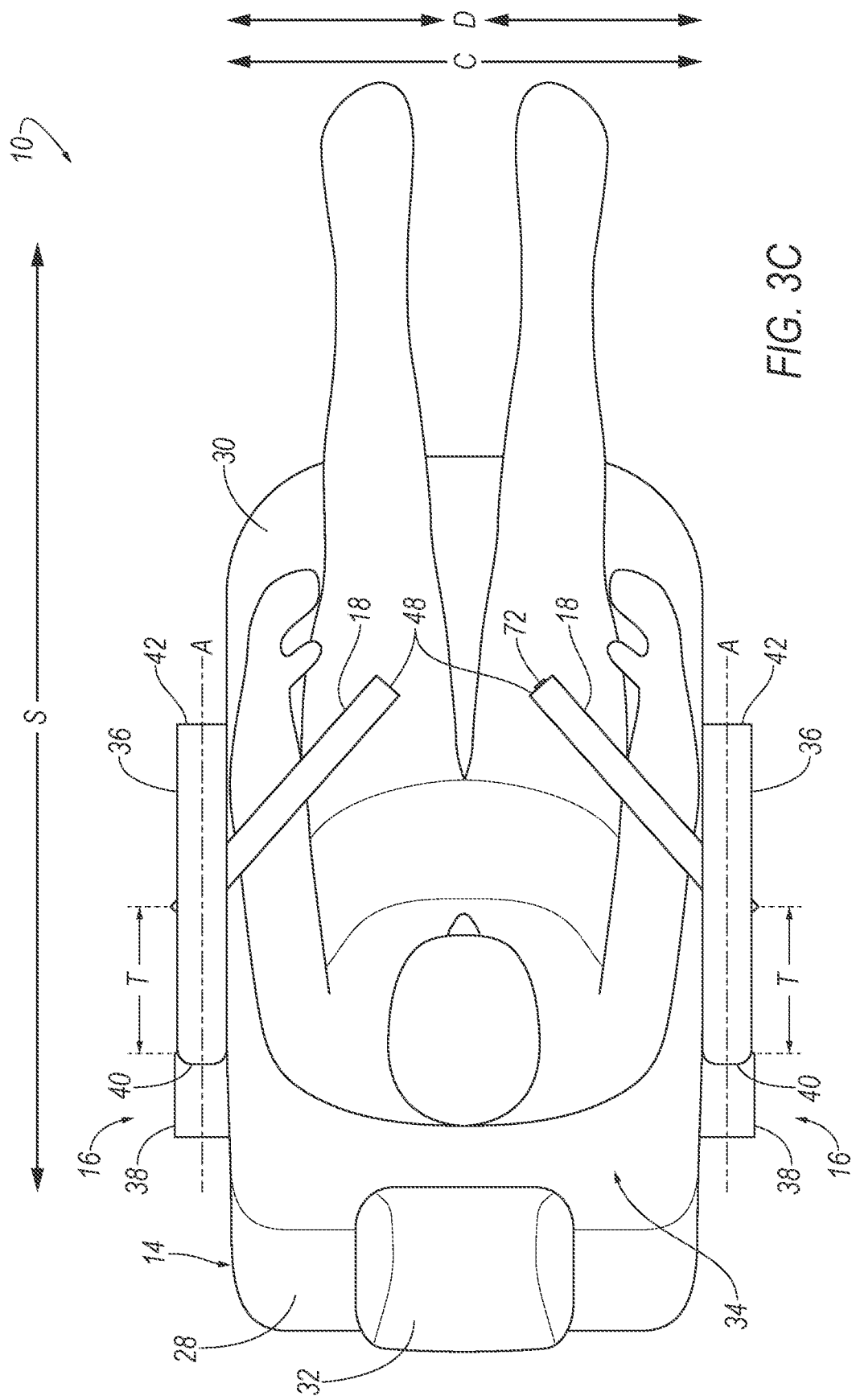
FIG. 3C is a top view of the vehicle seat shown in FIGS. 3A and 3B of the bars moving toward the deployed position and the pivoted position with the bars having the lock.
Figure 4A:
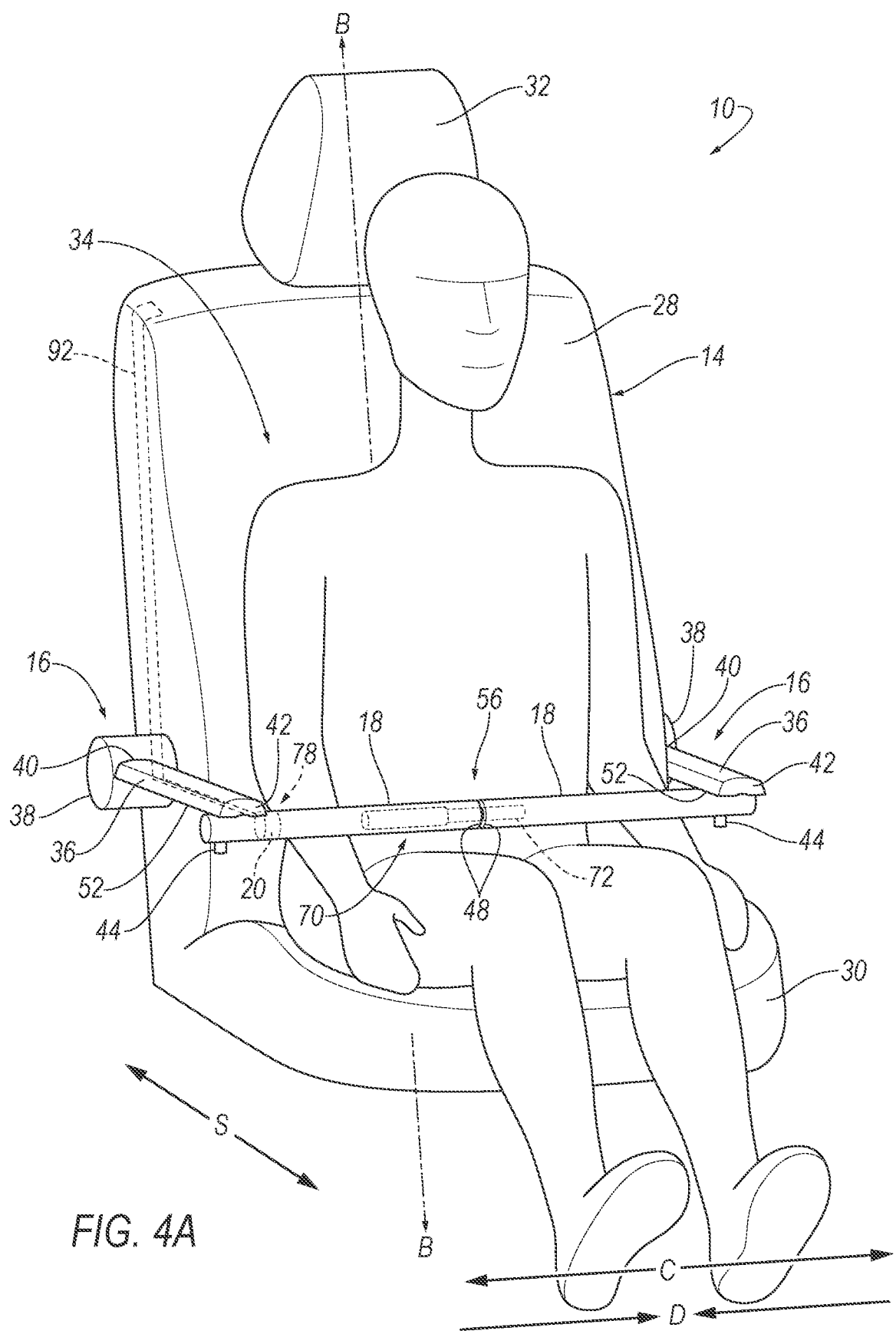
FIG. 4A is a perspective view of the vehicle seat with the bars in the deployed position and the pivoted position with the lock engaged.
Figure 4B:
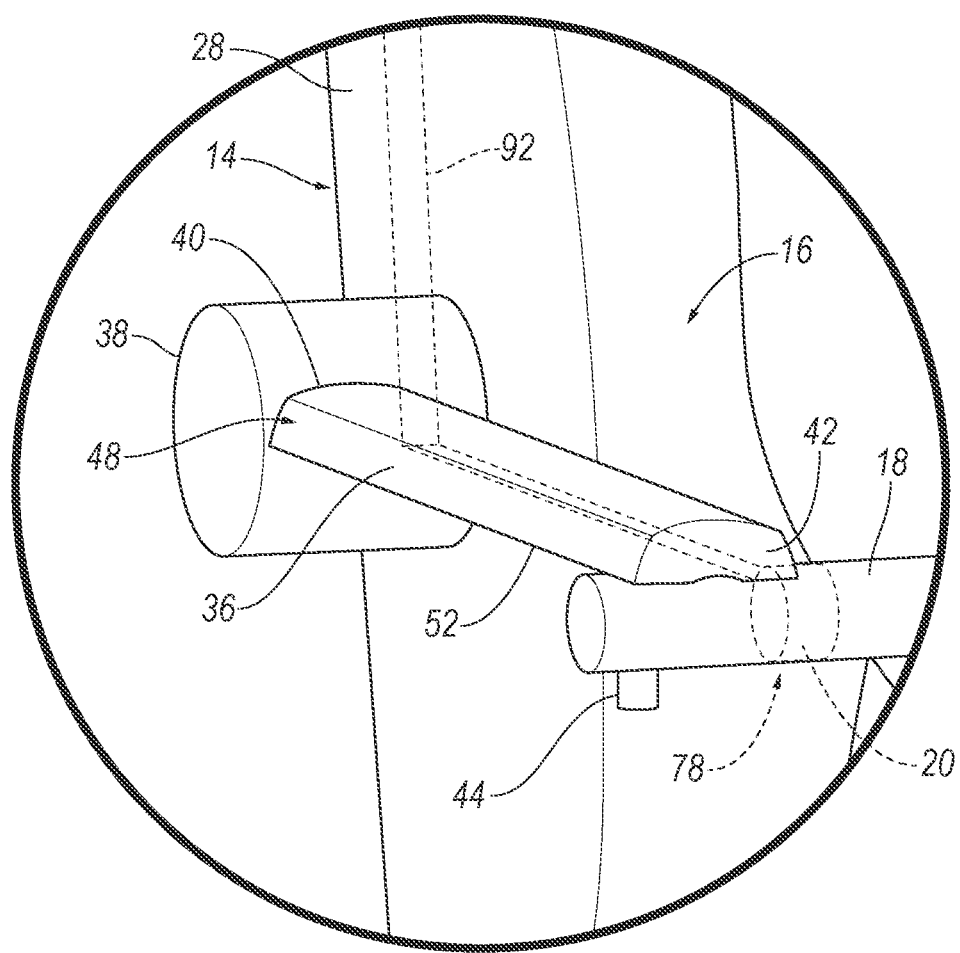
FIG. 4B is a perspective view of the armrest shown in FIG. 4A with the bars in the deployed position and the pivoted position with the lock engaged.
Figure 4C:
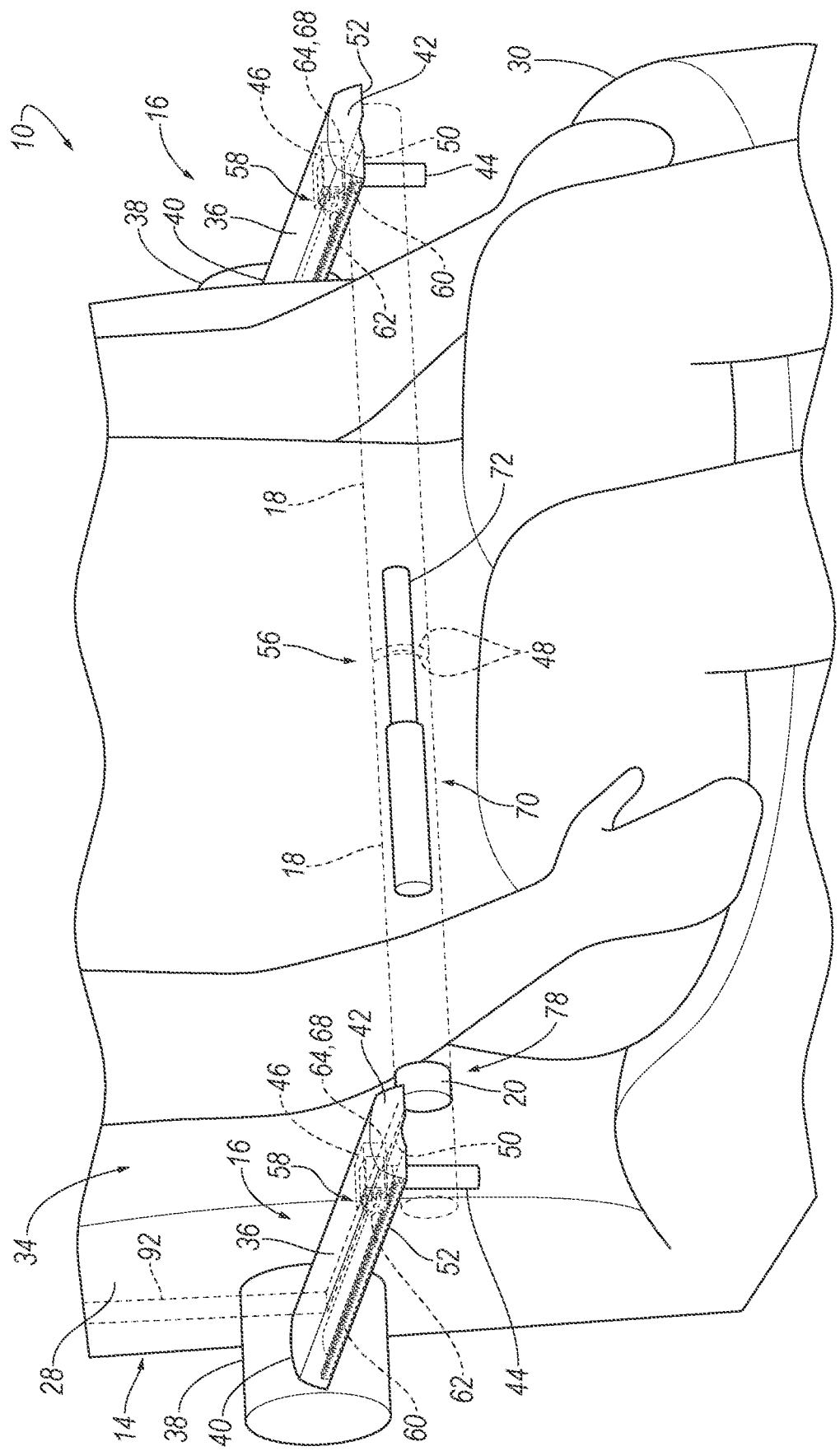
FIG. 4C is a perspective view of the vehicle seat shown in FIG. 4A and FIG. 4B with the bars in the deployed position and the pivoted position with the lock engaged.
Figure 4D:
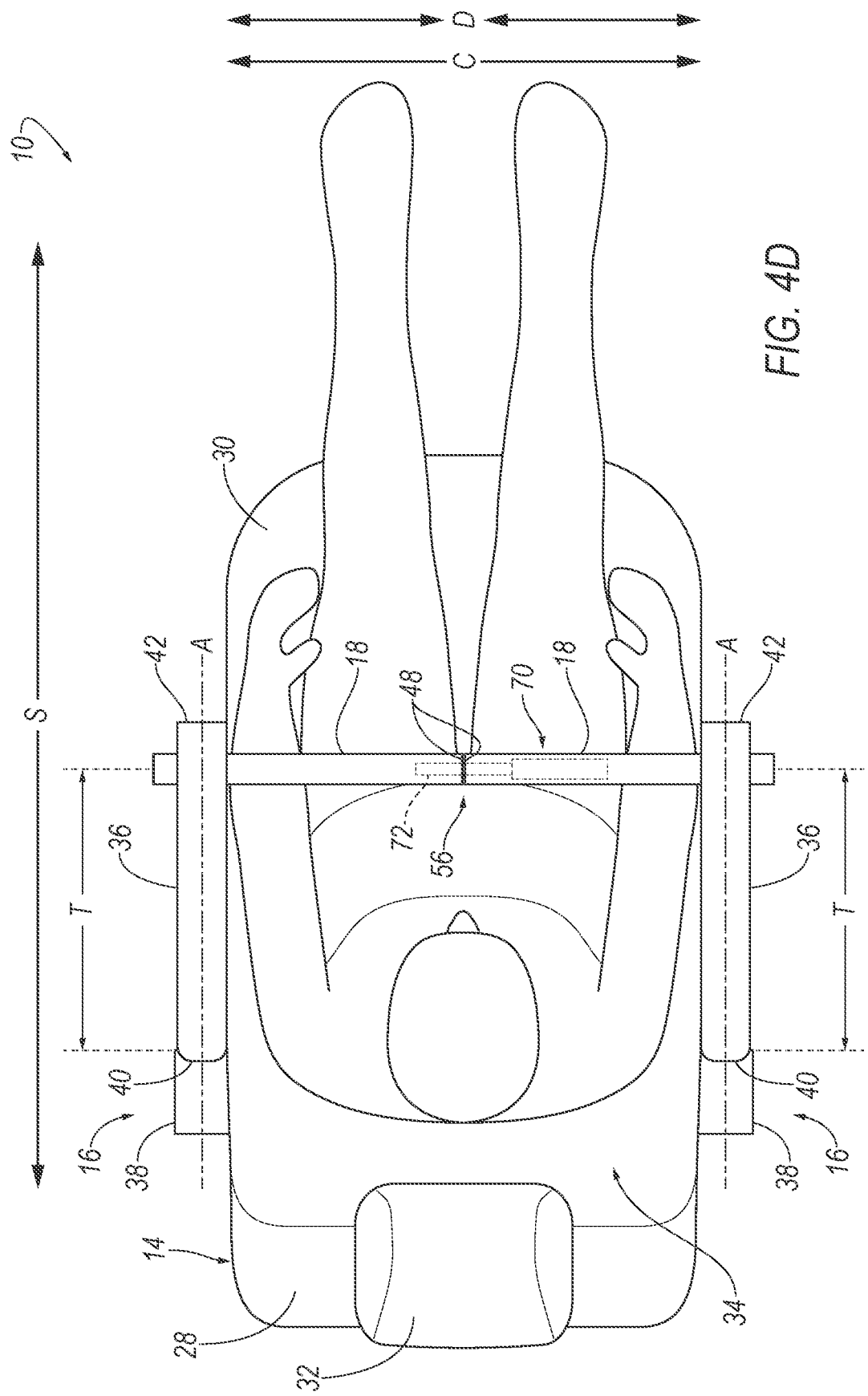
FIG. 4D is a top view of the vehicle seat shown in FIGS. 4A and 4B with the bars in the deployed position and the pivoted position and the lock engaged.

With reference to FIGS. 3B and 4C, the assembly 10 may include one or more linear actuators 58 fixed to one or more of the bars 18 and drivably coupled to the pin 44 to slide the bars 18 along the armrests 16. The assembly 10 may include a linear actuator 58 coupled to the carrier 46 of the bars 18 in the slot 50 to move the bars 18 along the first axis A. The linear actuator 58 may include a rack 60 and a pinion 62 to move the bars 18 along the armrests 16. In the example shown in the Figures, the linear actuator 58 may include a motor 64 that rotates the pinion 62 to move the pinion 62 along the rack 60, and in turn, moving the bars 18 along the armrests 16 to the deployed position. In other examples, the linear actuator 58 may be any suitable type of linear actuator 58, e.g., a drive screw, etc. A position sensor 66 may determine the translational distance T along the armrest 16 to stop the translation of the bar 18 at the deployed position.

A second motor 68 may be coupled to the pins of the bars 18 to rotate the pin. The v rotates the pin 44 to move the bars 18 from the non-pivoted position to the pivoted position. The second motor 68 may drive gears (not shown) to rotate the pins and pivot the bars 18 from the non-pivoted position to the pivoted position. The second motor 68 may be any suitable motor to move the bars 18 from non-pivoted position to the pivoted position.

The bars 18 are connectable to each other at the joint 56. Specifically, the bars 18 are lockable in the pivoted positions and the deployed positions. Specifically, the assembly 10 includes a lock 70 between the bars 18. In the pivoted position, the bars 18 are lockable to each other to maintain the bars 18 in the pivoted position. The lock 70 includes a post 72 supported by one of the bars 18. The post 72 may be movable relative to the bars 18. The other of the bars 18 may define a hole 74. When the bars 18 are in the pivoted position, the post 72 may move to be receivable by the other of the bars 18. Specifically, the post 72 moves into the hole 74 and the bars 18 are connected and locked to each other. In some examples, such as shown in the Figures, the lock 70 may be a solenoid. In such an example, the solenoid includes the post 72. In other examples, the bars 18 that supports the post 72 may include a motor (not shown) that moves the post 72 into and out of the hole 74.

The assembly 10 may include at least one proximity sensor 76 supported by the bars 18. The proximity sensor 76 may determine whether the bars 18 are in the deployed position and the pivoted position, i.e., a position to be locked together. Specifically, the proximity sensors 76 may determine that the bars 18 have reached a threshold distance from each other to move the post 72 of the lock 70 into the hole 74. In other words, the proximity sensors 76 may determine that the bars 18 have translated and pivoted to the deployed position and the pivoted position and have reached the joint 56. The proximity sensor 76 may be any suitable type of sensor, e.g., a camera, a laser, etc., to determine that the bars 18 have reached the pivoted position.

When the occupant of the seat 14 plans to exit the seat 14, the post 72 may be removed from the hole 74 to allow the bars 18 to move away from the pivoted position and the deployed position toward the non-pivoted and stowed position. Once the bars 18 reach the non-pivoted and stowed position, the occupant is able to leave the seat 14 and/or the vehicle 12.

Figure 5A:
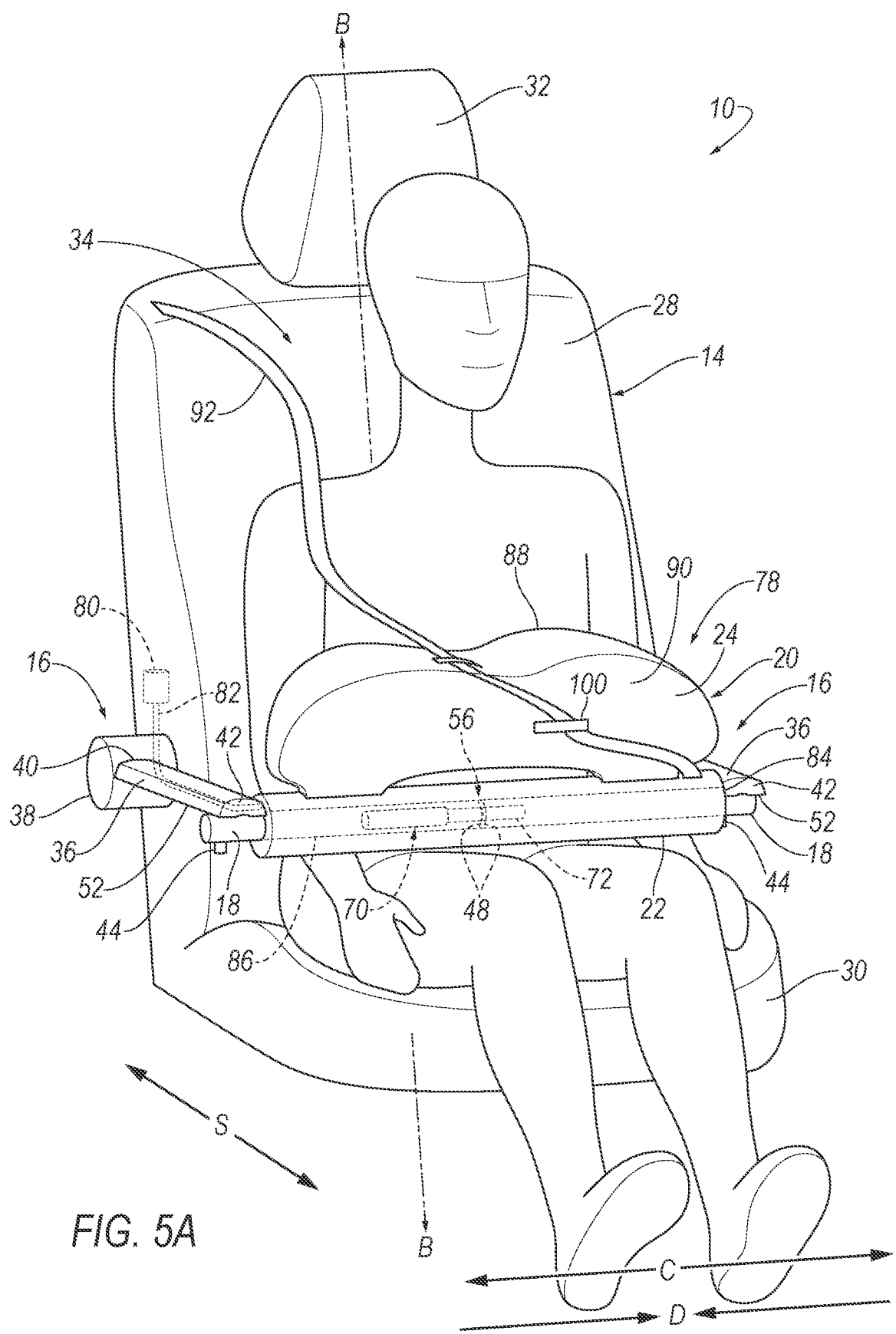
FIG. 5A is a perspective view of the vehicle seat with an airbag having a pair of inflatable portions in a partially inflated position.
Figure 5B:
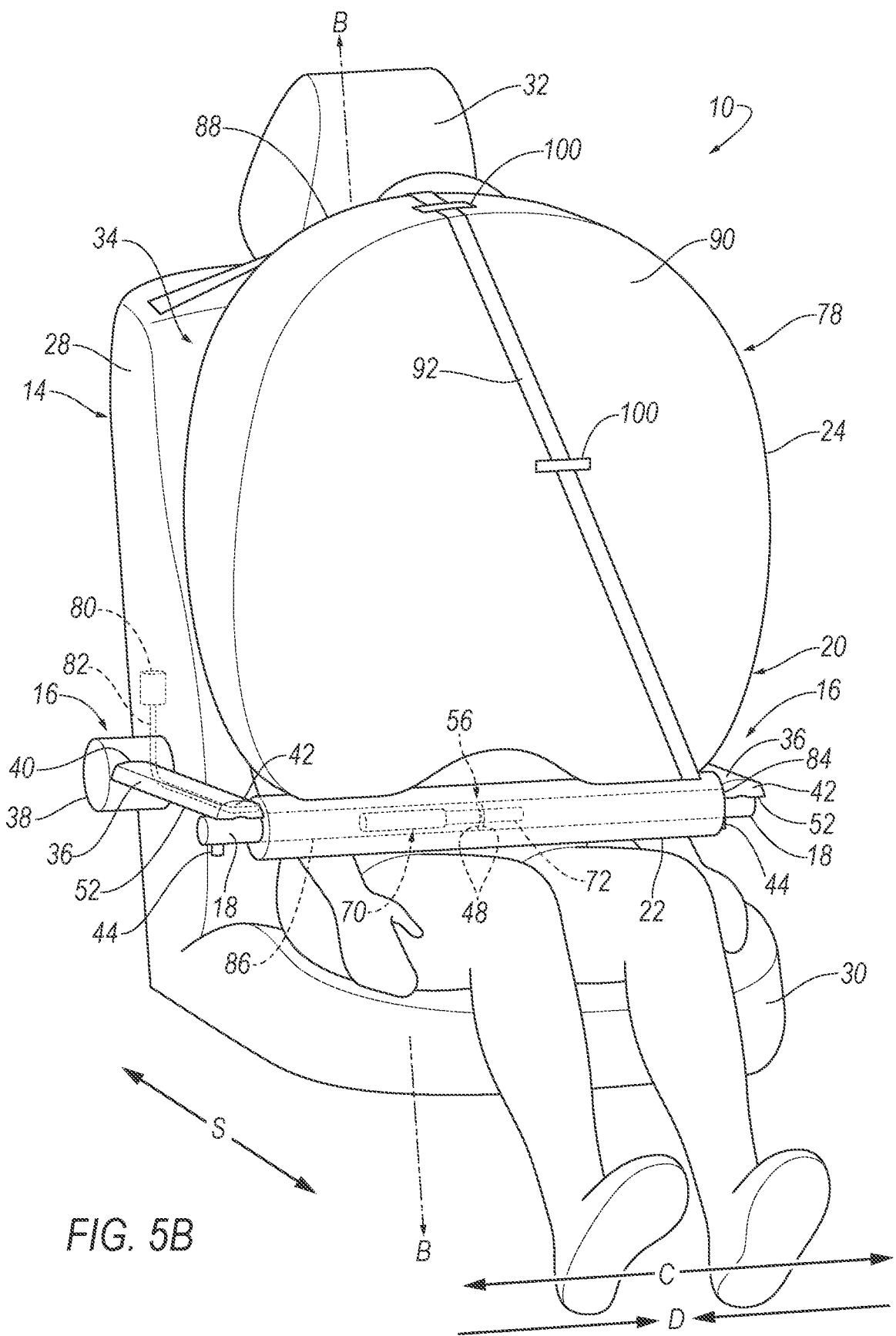
FIG. 5B is a perspective view of the vehicle seat with the airbag having the pair of inflatable portions in an inflated position.

With reference to FIGS. 4C, 5A and 5B, the assembly 10 includes an airbag assembly 78 supported by the seat 14. The airbag assembly 78 includes the airbag 20, an inflator 80, and may include a housing (not shown). The vehicle 12 may include any suitable number of airbag assemblies 78, e.g., an airbag assembly 78 supported by any of the seats 14. In examples including more than one airbag assembly 78, the airbag assemblies 78 may be identical or substantially identical to each other.

The inflator 80 is fluidly connected to the airbag 20. The inflator 80 expands the airbag 20 with inflation medium, such as a gas, to move the airbag 20 from the uninflated position to the inflated position. The inflator 80 may be, for example, a pyrotechnic inflator that ignites a chemical reaction to generate the inflation medium, a stored gas inflator that releases (e.g., by a pyrotechnic valve) stored gas as the inflation medium, or a hybrid. The airbag assembly 78 includes a fill tube 82 extending from the inflator 80 to the airbag 20.

The assembly 10 includes the airbag 20 inflatable from an uninflated position to the inflated position in the event of certain vehicle impacts. The airbag 20 is inflatable from the bars 18 to the inflated position when the bars 18 are in the deployed position and the pivoted position. In other words, the airbag 20 is inflatable when the bars 18 are connected and locked to each other. Specifically, as described further below, at least a portion of the airbag 20 is inflatable along the bars 18 to the inflated position when the bars 18 are in the deployed position, the pivoted position, and are locked and connected to each other.

The airbag 20 supported by one of the bars 18. As discussed further below, at least a portion of the airbag 20 is inflatable along both of the bars 18 from the uninflated position to the inflated position. In the uninflated position, the airbag 20 is supported adjacent one of the armrests 16. In other words, the airbag 20 is supported by the bar 18 at a position spaced from the bar distal ends 48 and the joint 56 between the bars 18. The bars 18 may define a recess (not numbered) that the airbag 20 fits into when the airbag 20 is in the inflated position. The airbag 20 may be covered by a trim cover (not numbered), e.g., plastic cover, cloth covering, etc., that includes a tear seam (not shown) that is frangible when the airbag 20 inflates. In other words, the tear seam breaks as the airbag 20 moves to the inflated position to control the kinematics of the occupant of the seat 14.

The airbag 20 includes the first inflatable portion 22 and the second inflatable portion 24. The first inflatable portion 22 of the airbag 20 is inflatable along the bar 18. Specifically, as the airbag 20 moves to the inflated position, the first inflatable portion 22 inflates along the bars 18 when the bars 18 are in the deployed position and the pivoted position. The second inflatable portion 24 is supported by the first inflatable portion 22 in the inflated position. As described further below, the second inflatable portion 24 inflates upwardly from the first inflatable portion 22 as the airbag 20 moves toward the inflated position. The airbag 20 may inflate in stages. For example, as shown in FIG. 5A, the first inflatable portion 22 may inflate fully toward the opposite armrest 16 prior to the second inflatable portion 24 reaching the inflated position. In other words, the airbag 20 may partially inflate. As shown in FIG. 5B, the second inflatable portion 24 inflates upwardly from the first inflatable portion 22 for the airbag 20 to reach the inflated position.

With continued reference to FIGS. 5A and 5B, as the airbag 20 moves toward the inflated position, the first inflatable portion 22 inflates away from the armrest 16 of which it is adjacent and toward the other armrest 16 the first inflatable portion 22 is adjacent the other armrest 16. In other words, the first inflatable portion 22 is inflatable along the bars 18 to an airbag distal end 84. The airbag distal end 84 is movable along the bar 18 as the airbag 20 inflates to the inflated position. In the inflated position, the first inflatable portion 22 is elongated from one armrest 16 to the other armrest 16 with the airbag distal end 84 being spaced from one of the armrests 16 and adjacent the other armrest 16. In other words, in the inflated position, the first inflatable portion 22 extends from one armrest 16 to the other armrest 16. The first inflatable portion 22 is elongated over the joint 56 of the bars 18 when the airbag 20 is in the inflated position. In other words, the joint 56 between the bars 18 is not visible when the airbag 20 is in the inflated position and the first inflatable portion 22 overlaps the bar distal ends 48 and the joint 56.

The first inflatable portion 22 surrounds the bars 18 when the bars 18 are in the deployed position and the pivoted position and when the airbag 20 is in the inflated position. The first inflatable portion 22 of the airbag 20 may be of a cylindrical shape about the bars 18 to surround the bars 18. Specifically, the first inflatable portion 22 may define a cylindrical cavity 86 within which the bars 18 are elongated through when the airbag 20 is in the inflated position.

The second inflatable portion 24 is supported by the first inflatable portion 22 when the airbag 20 is in the inflated position. Specifically, the second inflatable portion 24 inflates upwardly from the first inflatable portion 22 after the first inflatable portion 22 fully inflates. As the airbag distal end 84 moves along the bars 18, the second inflatable portion 24 is moved along the bars 18 to allow second inflatable portion 24 to inflate. The first inflatable portion 22 is in fluid communication with the second inflatable portion 24 to allow inflation medium to flow from the inflator 80 to the second inflatable portion 24 to move the airbag 20 from the uninflated position to the inflated position. The second inflatable portion 24 may control the kinematics of the occupant in the event of certain vehicle impacts. The second inflatable portion 24 may face toward the occupant to control the kinematics of the occupant in the event of certain vehicle impacts.

The second inflatable portion 24 includes a seat-inboard panel 88 and a seat-outboard panel 90. The seat-inboard panel 88 faces toward the seat 14 and the seat-outboard panel 90 faces away from the seat 14. The seat-inboard panel 88 faces toward the seatback 28, i.e., the occupant, of the seat 14 when the airbag 20 is in the inflated position. The occupant seating area 34 is between the seat 14 and the second inflatable portion 24. Specifically, the occupant seating area 34 is between the seat-inboard panel 88 and the seatback 28. The seat-inboard panel 88 may control the kinematics of the occupant of the seat 14 in the event of certain vehicle impacts.

The airbag 20, specifically the second inflatable portion 24 and, in some examples, the first inflatable portion 22, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane. The first inflatable portion 22 may be of any suitable material. For example, the first inflatable portion 22 may be of an inflatable polymeric material, e.g., polyurethane. The material of the first inflatable portion 22 may be any suitable material to allow the second inflatable portion 24 control the kinematics of the occupant.

With reference to FIGS. 5A and 5B, the assembly 10 includes a tether 92 extending from the seat 14 to the airbag 20. In other words, the tether 92 is elongated from the seat 14 to the airbag 20. Specifically, the tether 92 is elongated from the seatback 28 to the airbag 20 when the airbag 20 is in the uninflated position and when the airbag 20 is in the inflated position. The tether 92 is fixed to the seatback 28 of the seat 14 when the airbag 20 is in the uninflated position and the inflated position. Specifically, the tether 92 may be fixed to the seatback frame.

In the airbag 20 is in the uninflated position, the tether 92 may extend along the seatback 28 to the armrest 16 and bar 18 then to the airbag 20. Specifically, the tether 92 may extend along the second axis B of the seatback 28 to the airbag 20 when the airbag 20 is in the inflated position and when the bar 18 is in the stowed position and the non-pivoted position. When the bar 18 is in the stowed position and the non-pivoted position, the tether 92 may be retracted along the armrest 16. As the bars 18 move to the deployed position and the pivoted position, the tether 92 may elongate along the armrest 16. The tether 92 may stretch or elongate along the armrest 16 when the bars 18 move to the deployed position and the pivoted position. When the bars 18 return to the stowed position and the non-pivoted position, the tether 92 may retract along the armrest 16.

When the airbag 20 is in the inflated position, the tether 92 is elongated from the seat 14 to the first inflatable portion 22 of the airbag 20. Specifically, the tether 92 is elongated from the seatback 28 to the airbag distal end 84 of the first inflatable portion 22 of the airbag 20 when the airbag 20 is in the inflated position. As the airbag 20 moves to the inflated position, a tear seam (not shown) in the covering of the seatback 28 may release to allow the tether 92 to extend from seatback 28 to the airbag distal end 84 of the first inflatable portion 22.

As the airbag 20 inflates to the inflated position, the tether 92 elongates along the second inflatable portion 24. Specifically, the tether 92 is elongated along the second inflatable portion 24 when the airbag 20 is in the inflated position. The tether 92 is elongate from the airbag distal end 84 of the first inflatable portion 22 and along the second inflatable portion 24 to the seatback 28 of the seat 14. The tether 92 may extend across the occupant seating area 34 from the second inflatable portion 24 to the seatback 28.

The tether 92 may abut the second inflatable portion 24 to act as a reaction surface in the event of certain vehicle impacts. Specifically, the tether 92 abuts the seat-outboard panel 90 when the airbag 20 is in the inflated position. In other words, the tether 92 contacts the seat-outboard panel 90 to act as a reaction surface in the event of certain vehicle impacts. The tether 92 maintains the position of the second inflatable portion 24 to control the kinematics of the occupant in the event of certain vehicle impacts. The second inflatable portion 24 may include one or more tether guides 100 to maintain the position of the tether 92 along the seat-outboard panel 90 of the second inflatable portion 24. The tether 92 guides 100 maintain the position of the tether along the seat-outboard panel 90 such that the secondary inflatable portion 24 controls the kinematics of the occupant.

A pyrotechnic actuator 102 may be operatively coupled to the tether 92. Specifically, the pyrotechnic actuator 102 may be mounted to the seatback 28 and operatively coupled to the tether 92 at the seatback 28. In such an example the pyrotechnic actuator 102 includes a pyrotechnic charge that activates the pyrotechnic actuator 102 tighten the tether 92 along the second inflatable portion 24. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The pyrotechnic actuator 102 may be any suitable type such as a rotary actuator. For example, the pyrotechnic actuator 102 may be a rotary actuator where pyrotechnic charge rotates a shaft connected to the tether 92 such that the tether 92 wraps around the shaft; a piston linkage, in which the pyrotechnic charge for example, drives a piston attached to the tether 92; a ball-in-tube linkage, in which an pyrotechnic charge propels a ball or balls over a cogwheel connected to the tether 92; a mechanical linkage, in which a compressed spring attached to the tether 92 is released; or any other suitable type.

Figure 6:
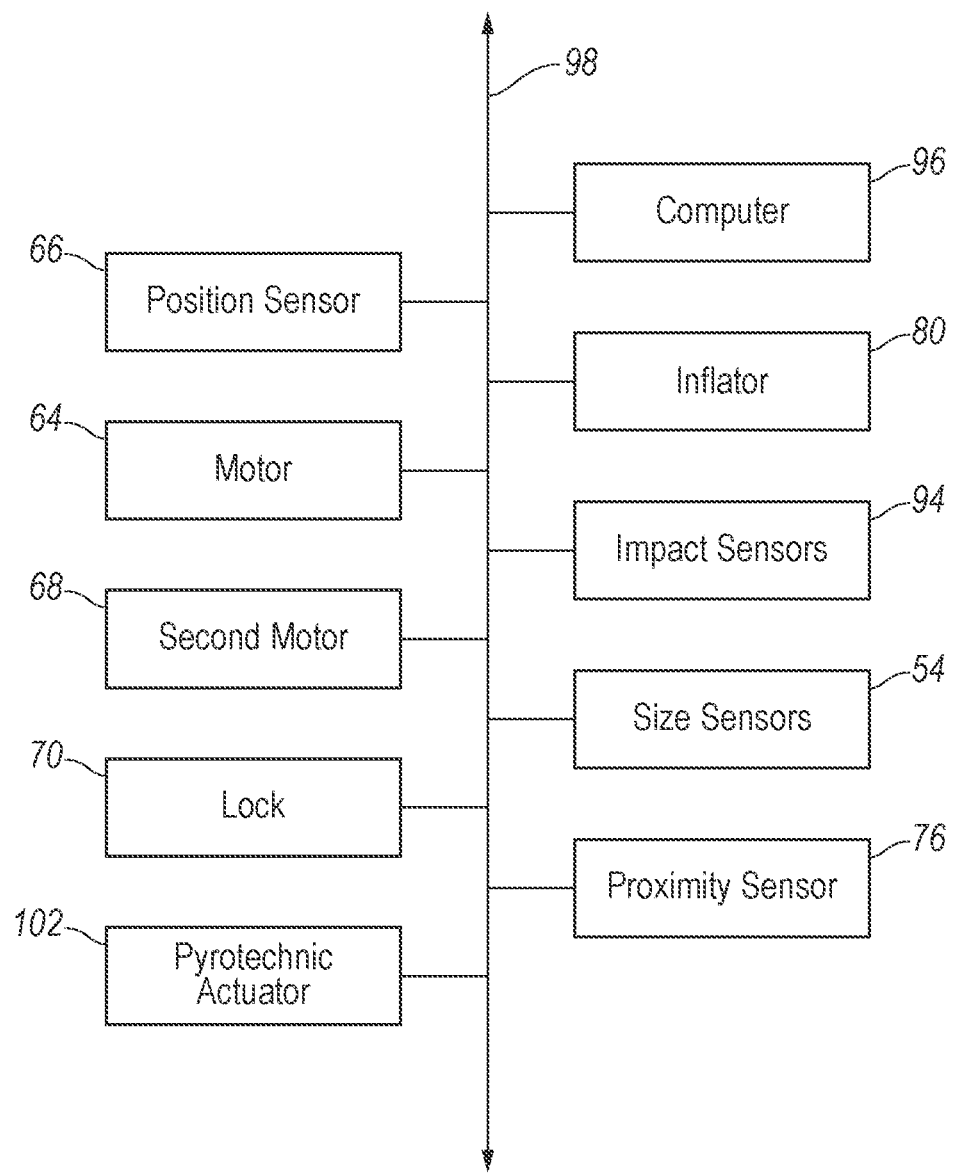
FIG. 6 is a block diagram of a vehicle communication network of the vehicle.

With reference to FIG. 6, the vehicle 12 may include at least one impact sensor 94 for sensing certain vehicle impacts, and a computer 96 may be in communication with the impact sensors 94. The impact sensor 94 is configured to detect certain vehicle impacts. The impact sensor 94 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 94 may be located at numerous points in or on the vehicle 12.

The vehicle 12 includes the computer 96 includes a processor and a memory. The memory includes one or more forms of computer 96 readable media, and stores instructions executable by the computer 96 for performing various operations, including as disclosed herein. The controller may be, for example, a restraints control module. In another example, the computer 96 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 96 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided premanufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 96. The memory may be of any type, e.g., hard disk drives, solid state drives, servers, or any volatile or non-volatile media. The memory may store the collected data sent from the sensors. The memory may be a separate device from the computer 96, and the computer 96 may retrieve information stored by the memory via a network in the vehicle 12, e.g., over a CAN bus, a wireless network, etc. Alternatively or additionally, the memory may be part of the computer 96, e.g., as a memory of the computer 96. The computer 96 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

With continued reference to FIG. 6, the computer 96 is generally arranged for communications on a vehicle communication network 98 that may include a bus in the vehicle 12 such as a controller area network CAN or the like, and/or other wired and/or wireless mechanisms. Alternatively or additionally, in cases where the computer 96 actually comprises a plurality of devices, the vehicle communication network 98 may be used for communications between devices represented as the computer 96 in this disclosure. Further, as mentioned below, various controllers and/or sensors may provide data to the computer 96 via the vehicle communication network 98.

Figure 7:
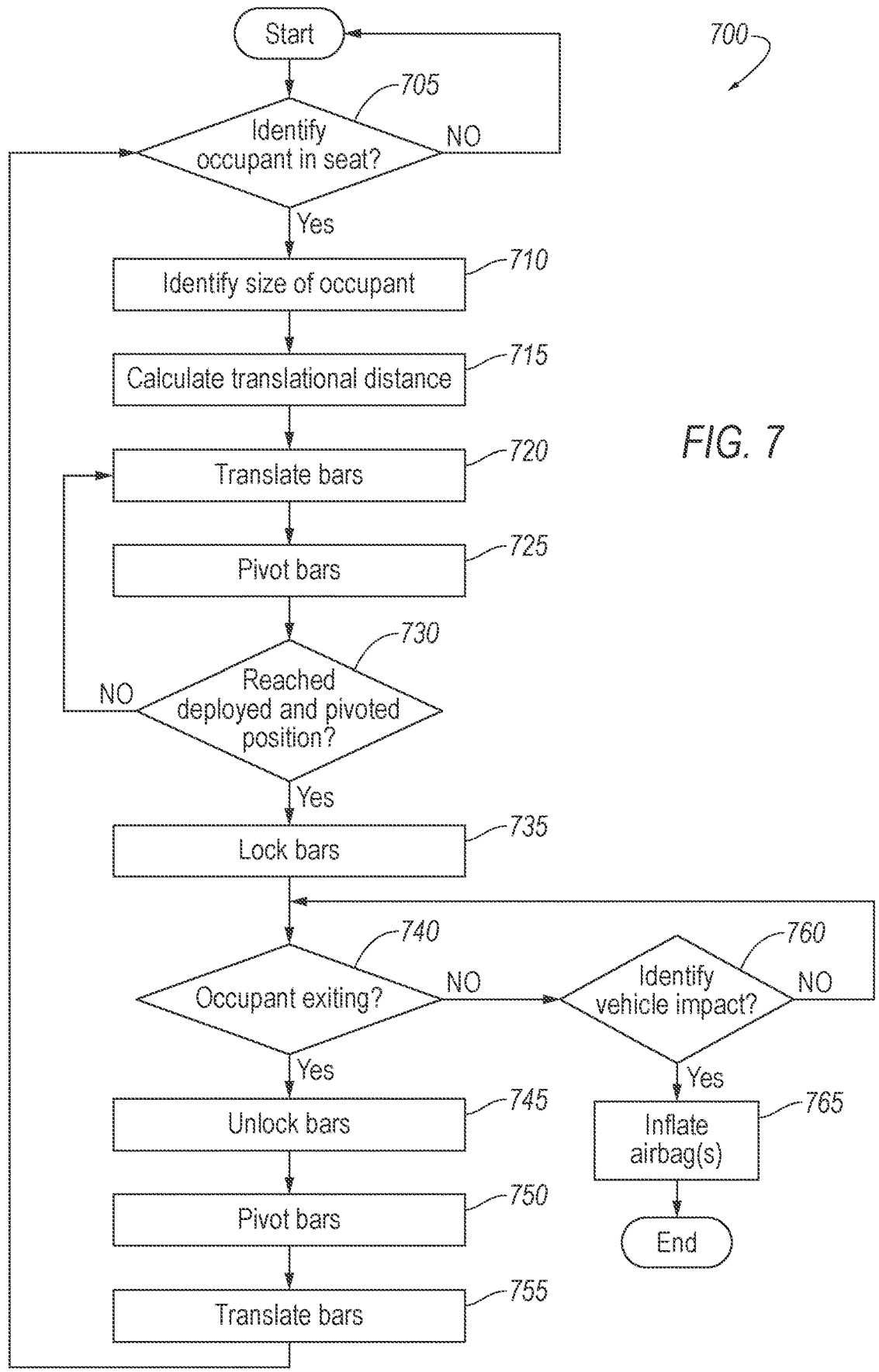
FIG. 7 is a flowchart of a method including instructions executable by a vehicle computer.

With reference to FIG. 7, the computer 96 stores instructions to control components of the vehicle 12 according to a method 700. Specifically, as shown in FIG. 7, the method 700 includes moving the bars 18 of the assembly 10 based on identification of an occupant seated in the seat 14. Use of "in response to," "based on," and "upon determining" herein, including with reference to method 700, indicates a causal relationship, not merely a temporal relationship.

With reference to decision block 705, the method 700 includes identifying an occupant is seated in the seat 14. The size sensor 54, e.g., a weight sensor or camera as described above, may be in communication with the computer 96 to identify an occupant is seated in the seat 14. If no occupant is identified as being seated in the seat 14, the method 700 returns to the start. If an occupant is identified in the seat 14, the method 700 moves to block 710.

With reference to block 710, the method 700 includes identifying the size of the occupant. The size sensors 54 of the vehicle 12 determine the size of the occupant, e.g., weight, height, body type, percentile, etc.

With reference to block 715, based on the size of the occupant, the method 700 include calculating the translational distance T to determine the deployed positions of the bars 18. As discussed above, the translational distance T may be shorter for smaller occupants or longer for larger occupants.

With reference to block 720, based on the calculated translational distance T, the method 700 includes actuating the linear actuators 58 to translate the bars 18 to the deployed positions. The linear actuators 58 move the bars 18 along the translational distance T to the deployed positions.

With reference to block 725, the method 700 includes actuating the second motors 68 to pivot the bars 18 to the pivoted position. The second motors 68 rotate the pins of the bars 18 to rotate the bars 18 toward the pivoted position. The bars 18 extend across the lap of the occupant of the seat 14 in the pivoted and deployed position. Block 720 and block 725 may both be initiated simultaneously or block 720 may be initiated after the completion of block 725.

With reference to decision block 730, the method 700 includes determining the bars 18 have reached the deployed position and the pivoted position. The proximity sensor 76 may send a signal to the computer 96 indicating that the bars 18 have reached the deployed position and the pivoted position. If the bars 18 have not reached the deployed position and pivoted position, the method 700 returns to block 720. If the bars 18 have reached the deployed position and the pivoted position, the method 700 moves to block 735.

With reference to block 735, based on the bars 18 reaching the pivoted position, the method 700 includes activating the lock 70 of the bars 18 to connect the bars 18 and lock 70 the bars 18 in the pivoted position. In examples wherein the lock 70 is a solenoid, the method 700 includes activating the solenoid. The post 72 supported by one of the bars 18 moves into the hole 74 of the other of the bars 18.

With respect to decision block 740, the method 700 includes determining whether the occupant is exiting the seat 14. In some examples, the occupant may indicate manually that the occupant is exiting the seat 14, e.g., by activating a button or switch supported by any suitable component of the vehicle 12, such as the seat 14 or an instrument panel. In other examples, sensors may indicate that the occupant is exiting the seat 14, e.g., by cameras, weight sensors, etc. In response to determining the occupant is exiting the seat 14, the method 700 moves to block 745. If the occupant is not determined to be exiting the seat 14, the block 740 moves to block 760.

With respect to block 745, in response to determining the occupant is exiting the seat 14, the method 700 includes activating the lock 70 to unlock the lock 70. The post 72 of the lock 70 is removed from the hole 74 and the bars 18 are able to move from the pivoted position.

With respect to block 750, the method 700 includes activating the second motors 68 to pivot the bars 18 from the pivoted position to the non-pivoted position. The second motor 68 rotates the pin 44 to pivot the bars 18 to the non-pivoted position.

With respect to block 755, the method 700 includes activating linear actuators 58 to translate the bars 18 from the deployed position to the stowed position. Block 750 and block 750 may both be initiated simultaneously or block 755 may be initiated after the completion of block 750. After the bars 18 translate, the method 700 returns to decision block 705 to identify whether an occupant is seated in the seat 14.

With respect to decision block 760, in response to determining the occupant is not exiting the vehicle 12, the method 700 includes identifying whether a certain vehicle impact has occurred to the vehicle 12. In the event of certain impacts, the impact sensors 94 communicate the occurrence of the impact to the computer 96. If certain vehicle impacts are identified, the method 700 moves to block 765. If no impact is identified, the method 700 returns to decision block 740 to determining whether the occupant is exiting the seat 14.

With respect to block 765, the method 700 includes inflating the airbag 20 to the inflated position. The inflator 80 passes inflation medium through the fill tube 82 to inflate the airbag 20 to the inflated position. The method 700 ends after the inflation of the airbag 20.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
   a seat;
   an armrest supported by the seat, the armrest elongated along an axis;
   a bar supported by the armrest, the bar being translatable along the axis from a stowed position overlapping the armrest to a deployed position extending from the armrest;
   the bar being pivotable relative to the armrest in a seat-inboard direction from a non-pivoted position to a pivoted position;
   an airbag supported by the bar, the airbag being inflatable from the bar to an inflated position when the bar is in the deployed position and the pivoted position;
   the airbag having a first inflatable portion inflatable along the bar and the first inflatable portion surrounding the bar in the inflated position; and
   the airbag having a second inflatable portion supported by the first inflatable portion in the inflated position, the second inflatable portion being inflatable upwardly from the first inflatable portion.

2. The assembly of claim 1, further comprising:
   a second armrest supported by the seat, the second armrest spaced in a cross-seat direction from the armrest and the second armrest being elongated along a second axis spaced from the axis;
   a second bar supported by the second armrest, the second bar being translatable along the second axis from a stowed position overlapping the second armrest to a deployed position extending from the armrest; and
   the second bar being pivotable relative to the second armrest in a seat-inboard direction from a non-pivoted position to a pivoted position.

3. The assembly of claim 2, wherein the first inflatable portion is inflatable along the bar and the second bar when the bar and the second bar are in the deployed positions and the pivoted positions, the first inflatable portion surrounding the bar and the second bar in the inflated position.

4. The assembly of claim 2, wherein the first inflatable portion extends from the armrest to the second armrest in the inflated position.

5. The assembly of claim 2, wherein the bar is lockable to the second bar in the pivoted positions and the deployed positions.

6. The assembly of claim 1, wherein the seat defines an occupant seating area between the seat and the bar when the bar is in the pivoted position and the deployed position.

7. The assembly of claim 6, wherein the occupant seating area is between the seat and the second inflatable portion.

8. The assembly of claim 1, wherein the first inflatable portion inflates away from the armrest to a distal end spaced along the bar from the armrest, the distal end being movable along the bar as the airbag inflates to the inflated position.

9. The assembly of claim 1, further comprising a tether elongated from the seat to the airbag.

10. The assembly of claim 9, wherein the tether is elongated from the seat to the first inflatable portion of the airbag.

11. The assembly of claim 9, wherein the seat includes a seatback elongated along a second axis and the airbag is inflatable from an uninflated position to the inflated position, the tether being elongated along the second axis of the seatback to the airbag when the airbag is in the uninflated position and when the bar is in the stowed position and non-pivoted position.

12. The assembly of claim 9, wherein the seat includes a seatback elongated along a second axis and the airbag is inflatable from an uninflated position to the inflated position, the tether being elongated along the second axis of the seatback and the axis of the armrest when the airbag is in the uninflated position and the bar is in the deployed position and the pivoted position.

13. The assembly of claim 12, wherein the tether is elongated from the seatback to the first inflatable portion of the airbag when the airbag is in the inflated position.

14. The assembly of claim 9, wherein the first inflatable portion inflates away from the armrest to a distal end spaced from the armrest, the tether being elongated from the seat to the distal end of the first inflatable portion.

15. The assembly of claim 9, wherein the seat defines an occupant seating area between the seat and the second inflatable portion, the tether extending across the occupant seating area when the airbag is in the inflated position.

16. The assembly of claim 9, wherein the second inflatable portion includes a seat-inboard panel facing toward the seat and a seat-outboard panel facing away from the seat, the tether being elongated along the seat-outboard panel when the airbag is in the inflated position.

17. The assembly of claim 16, wherein the tether abuts the seat-outboard panel when the airbag is in the inflated position.

18. The assembly of claim 9, wherein the tether abuts the second inflatable portion when the airbag is in the inflated position.

19. The assembly of claim 1, wherein the first inflatable portion is of an inflatable polymeric material.

20. The assembly of claim 1, wherein the first inflatable portion is in fluid communication with the second inflatable portion.

* * * * *